(12) United States Patent
Thompson et al.

(10) Patent No.: US 10,356,526 B2
(45) Date of Patent: Jul. 16, 2019

(54) COMPUTERS, METHODS FOR CONTROLLING A COMPUTER, AND COMPUTER-READABLE MEDIA

(71) Applicant: RAZER (ASIA-PACIFIC) PTE. LTD., Singapore (SG)

(72) Inventors: Russell David Thompson, Georgetown, TX (US); Joseph Mario Giannuzzi, Cedar Park, TX (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/763,414

(22) PCT Filed: Sep. 28, 2015

(86) PCT No.: PCT/SG2015/050346
§ 371 (c)(1),
(2) Date: Mar. 26, 2018

(87) PCT Pub. No.: WO2017/058097
PCT Pub. Date: Apr. 6, 2017

(65) Prior Publication Data
US 2018/0310098 A1    Oct. 25, 2018

(51) Int. Cl.
*H04R 3/12* (2006.01)
*H04R 5/02* (2006.01)
(Continued)

(52) U.S. Cl.
CPC .............. *H04R 3/12* (2013.01); *G06F 3/162* (2013.01); *H04R 5/02* (2013.01); *H04R 5/04* (2013.01);
(Continued)

(58) Field of Classification Search
CPC ... H04R 3/12; H04R 5/02; H04R 5/04; H04R 2420/05; H04R 2420/07; H04R 2499/15;
(Continued)

(56) References Cited

U.S. PATENT DOCUMENTS

| | | |
|---|---|---|
| 5,930,376 A | 7/1999 | Markow et al. |
| 6,007,228 A | 12/1999 | Agarwal et al. |

(Continued)

FOREIGN PATENT DOCUMENTS

| | | |
|---|---|---|
| DE | 102008042911 A1 | 4/2010 |
| EP | 1777990 A2 | 4/2007 |

(Continued)

OTHER PUBLICATIONS

Extended European Search Report dated Aug. 7, 2018, 8 pages, for the corresponding European Patent Application No. 15905525.0.

(Continued)

*Primary Examiner* — Andrew L Sniezek
(74) *Attorney, Agent, or Firm* — Polsinelli PC (57) ABSTRACT

According to various embodiments, a computer may be provided. The computer may include: an internal speaker; an interface configured to provide information for audio output to an external speaker; an audio playback circuit configured to provide audio information to at least one of the internal speaker or the external speaker, wherein the audio information includes information for a plurality of channels; a determination circuit configured to determine whether an external speaker is connected to the interface; and a controller configured to control the internal speaker to output audio information related to all channels of the plurality of channels when the determination circuit detects that an external speaker is not connected to the interface, and to control the internal speaker to output audio information related to a first subset of channels of the plurality of (Continued)

channels and to control the interface so that the external speaker outputs a second subset of channels of the plurality of channels when the determination circuit detects that an external speaker is connected to the interface. According to various embodiments the audio may be processed by a custom HRTF and or DSP in order to improve audio fidelity and user experience.

15 Claims, 8 Drawing Sheets

(51) Int. Cl.
  *H04R 5/04* (2006.01)
  *G06F 3/16* (2006.01)
  *H04S 7/00* (2006.01)

(52) U.S. Cl.
  CPC ............ *H04S 7/30* (2013.01); *H04R 2420/05* (2013.01); *H04R 2420/07* (2013.01); *H04R 2499/15* (2013.01); *H04S 2400/01* (2013.01); *H04S 2400/03* (2013.01); *H04S 2420/01* (2013.01)

(58) Field of Classification Search
  CPC .... H04S 7/30; H04S 2400/01; H04S 2400/03; H04S 2420/01; G06F 3/162
  See application file for complete search history.

(56) References Cited

U.S. PATENT DOCUMENTS

| | | | |
|---|---|---|---|
| 6,374,148 | B1 | 4/2002 | Dharmarajan et al. |
| 6,618,636 | B1 | 9/2003 | Sakai et al. |
| 7,167,571 | B2 | 1/2007 | Bantz et al. |
| 8,160,733 | B2 | 4/2012 | Huang et al. |
| 8,214,447 | B2 | 7/2012 | Deslippe et al. |
| 8,239,559 | B2 | 8/2012 | Rajapakse |
| 8,472,631 | B2 | 6/2013 | Klayman et al. |
| 8,675,892 | B2 | 3/2014 | Hogue et al. |
| 8,873,767 | B2 | 10/2014 | Regler |
| 2004/0122543 | A1 | 6/2004 | Lee et al. |
| 2006/0009984 | A1 | 1/2006 | Lim |
| 2011/0301731 | A1 | 12/2011 | Okimoto et al. |
| 2013/0034232 | A1 | 2/2013 | Lee |
| 2013/0089217 | A1* | 4/2013 | Kelloniemi ............ H04R 27/00 381/77 |
| 2014/0072129 | A1 | 3/2014 | Jung |
| 2014/0094944 | A1 | 4/2014 | Morcelli et al. |
| 2014/0105426 | A1 | 4/2014 | Fincham |
| 2014/0369540 | A1 | 12/2014 | Chen et al. |
| 2018/0302735 | A1* | 10/2018 | Dougherty ............ H04S 7/301 |

FOREIGN PATENT DOCUMENTS

| | | |
|---|---|---|
| WO | WO 2014/036085 | 3/2014 |
| WO | WO 2014043501 A1 | 3/2014 |
| WO | WO 2014/081384 | 5/2014 |

OTHER PUBLICATIONS

International Search Report and Written Opinion, dated Jun. 28, 2016, for the corresponding International Application No. PCT/SG2015/050346 in 10 pages.

* cited by examiner

COMPUTERS, METHODS FOR CONTROLLING A COMPUTER, AND COMPUTER-READABLE MEDIA

TECHNICAL FIELD

Various embodiments generally relate to computers, methods for controlling a computer, and computer-readable media.

BACKGROUND

In commonly used notebook PCs (personal computers), when a user connects external speakers to a notebook PC, the internal speakers are disabled and unavailable for audio playback. However, there may be a desire for making efficient use of the internal speakers.

SUMMARY OF THE INVENTION

According to various embodiments, a computer may be provided. The computer may include: an internal speaker; an interface configured to provide information for audio output to an external speaker; an audio playback circuit configured to provide audio information to at least one of the internal speaker or the external speaker, wherein the audio information includes information for a plurality of channels; a determination circuit configured to determine whether an external speaker is connected to the interface; and a controller configured to control the internal speaker to output audio information related to all channels of the plurality of channels when the determination circuit detects that an external speaker is not connected to the interface, and to control the internal speaker to output audio information related to a first subset of channels of the plurality of channels and to control the interface so that the external speaker outputs a second subset of channels of the plurality of channels when the determination circuit detects that an external speaker is connected to the interface.

According to various embodiments, a method for controlling a computer may be provided. The method may include: controlling an internal speaker; controlling an interface to provide information for audio output to an external speaker; providing audio information to at least one of the internal speaker or the external speaker, wherein the audio information includes information for a plurality of channels; determining whether an external speaker is connected to the interface; controlling the internal speaker to output audio information related to all channels of the plurality of channels when it is detected that an external speaker is not connected to the interface; and controlling the internal speaker to output audio information related to a first subset of channels of the plurality of channels and controlling the interface so that the external speaker outputs a second subset of channels of the plurality of channels when it is detected that an external speaker is connected to the interface.

According to various embodiments, a computer-readable medium may be provided. The computer-readable medium may include instructions which, when executed by a computer, make the computer perform a method for controlling a computer, the method including: controlling an internal speaker; controlling an interface to provide information for audio output to an external speaker; providing audio information to at least one of the internal speaker or the external speaker, wherein the audio information includes information for a plurality of channels; determining whether an external speaker is connected to the interface; controlling the internal speaker to output audio information related to all channels of the plurality of channels when it is detected that an external speaker is not connected to the interface; and controlling the internal speaker to output audio information related to a first subset of channels of the plurality of channels and controlling the interface so that the external speaker outputs a second subset of channels of the plurality of channels when it is detected that an external speaker is connected to the interface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the computer as described in this description may include a memory which is for example used in the processing carried out in the computer. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Figure 1A:
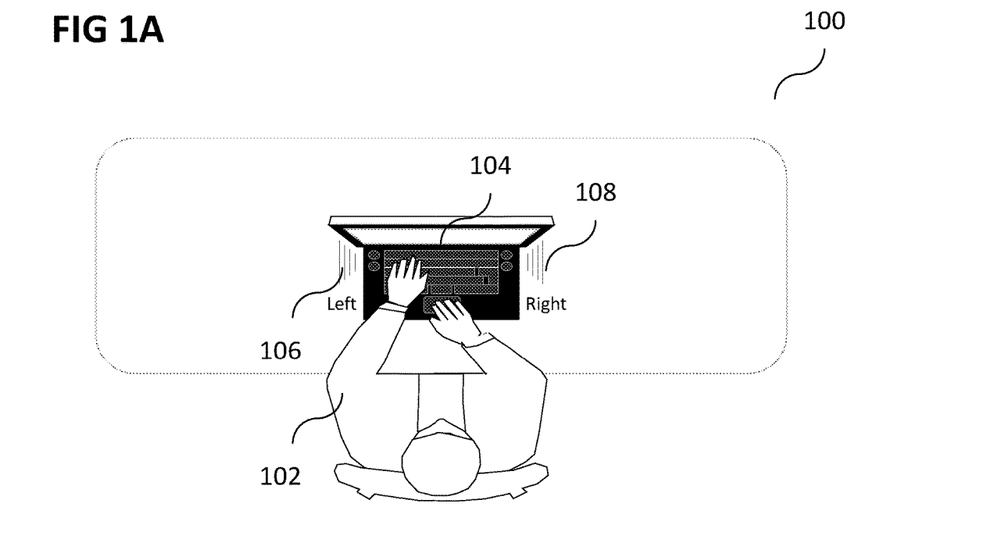
FIG. 1A and FIG. 1B show illustrations of a common audio configurations for notebook usage.
Figure 1B:
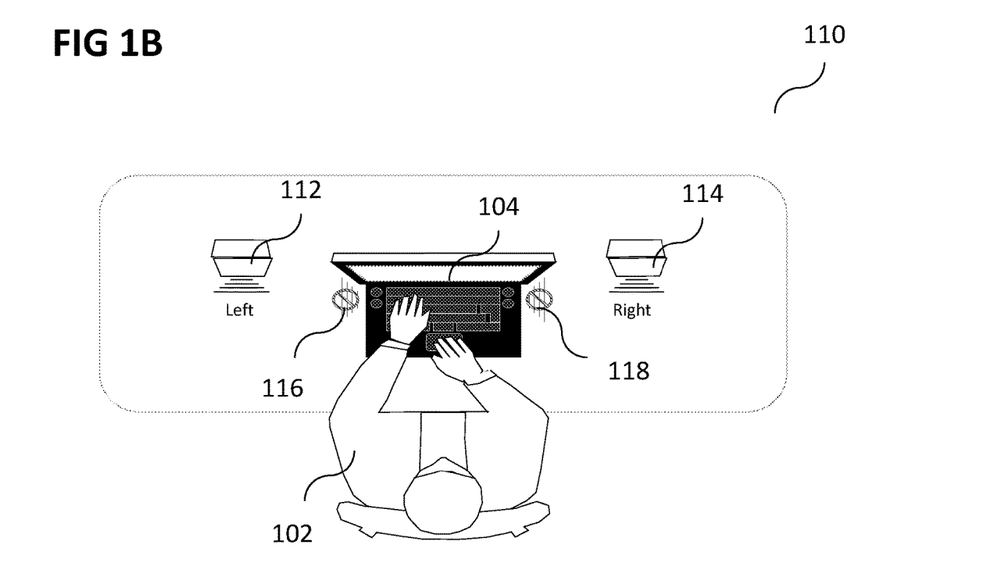

In commonly used notebook PCs (personal computers), when a user connects external speakers to a notebook PC, the internal speakers are disabled and unavailable for audio playback, like illustrated in FIG. 1A and FIG. 1B. In other words, when the user connects the notebook PC to a set of external speakers, the internal speakers (in other words: the existing hardware) are disabled and un-used; not taking full advantage of available hardware for audio playback.

FIG. 1A shows an illustration 100 of a commonly used notebook 104 (in other words: laptop; in other words: mobile computer) with no external speakers connected to the notebook 104. When user 102 uses the notebook 104 for audio output, audio may be output through a left speaker of the notebook 104 (for example a left channel like illustrated by 106) and through a right speaker of the notebook 104 (for example a right channel like illustrated by 108).

FIG. 1B shows an illustration 100 of the commonly used notebook 104 with external speakers 112 and 114 connected to the notebook 104. Like illustrated by 116 and 118, the internal speakers of the notebook 104 may be mute once external speakers are connected to the notebook 104, and the external speakers may output the audio (for example the left speaker 112 may output the left channel and the right speaker 114 may output the right channel).

According to various embodiments, the internal speakers may be used in a way that is advantageous and that allows for support of the various usage models a user may want to enable.

According to various embodiments, the speakers are not disabled, rather they may be re-purposed and controlled programmatically to allow for various multi-channel audio playback scenarios, like will be described in more detail below.

According to various embodiments, a programmable internal speaker (or programmable internal speakers) may be provided, for example a repurposed (internal or laptop) speaker.

According to various embodiments, devices and methods may be provided for programmatic and dynamic repurposing of internal notebook speakers.

According to various embodiments, devices and methods may be provided for the management and repurposing of the internal speakers of a notebook/laptop computer. Hardware and software components may be configured so that the user may re-purpose the internal speakers of a notebook PC when used in conjunction with external speakers. This may create a number of new use cases and unique configurations for the playback of immersive, multi-channel audio content like movies, videos and games.

Figure 2A:
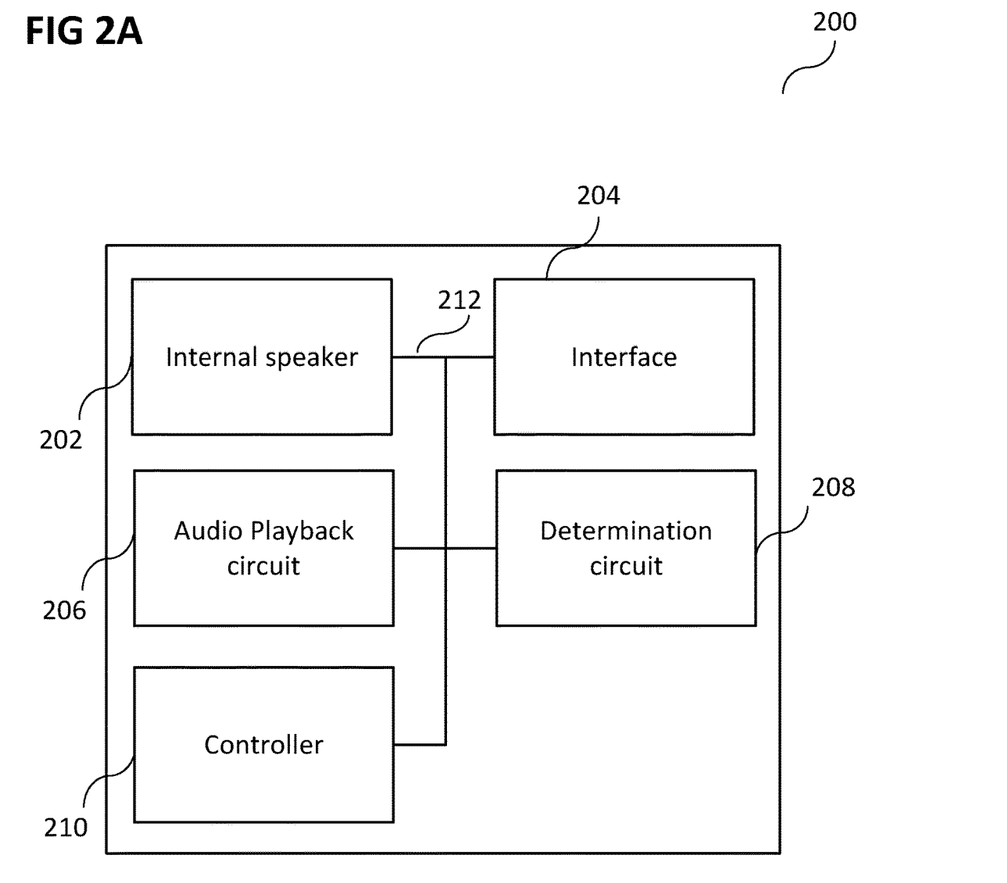
FIG. 2A and FIG. 2B show computers according to various embodiments.

FIG. 2A shows a computer 200 according to various embodiments. The computer 200 may include an internal speaker 202 (which is included in the computer; in other words: which is a part of the computer). The computer 200 may further include an interface 204 (for example a wired interface, such as a stereo jack or USB, for a wireless interface, such as Bluetooth or Wireless LAN (local area network)) configured to provide information for audio output to an external speaker (which is not a part of the computer 200). The computer 200 may further include an audio playback circuit 206 configured to provide audio information to at least one of the internal speaker 202 or the external speaker. The audio information may include information for a plurality of channels. The computer 200 may further include a determination circuit 208 configured to determine whether an external speaker is connected to the interface 204. The computer 200 may further include a controller 210 configured to control the internal speaker 202 to output audio information related to all channels of the plurality of channels when the determination circuit detects that an external speaker is not connected to the interface, and to control the internal speaker 202 to output audio information related to a (non-empty) first subset of channels of the plurality of channels and to control the interface so that the external speaker outputs a (non-empty) second subset of channels of the plurality of channels when the determination circuit 208 detects that an external speaker is connected to the interface 202. The internal speaker 202, the interface 204, the audio playback circuit 206, the determination circuit 208, and the controller 210 may be coupled with each other, like indicated by lines 212, for example electrically coupled, for example using a line or a cable, and/or mechanically coupled.

In other words, a computer may detect whether an external speaker is connected to the computer. If no external speaker is connected, then all channels are output by the internal speaker (or internal speakers) of the computer. If at least one external speaker is connected, then both the internal speaker(s) and the external speaker(s) may be used for outputting (different) channels.

It will be understood that any number of internal speakers may be provided, for example one internal speaker, or a plurality of internal speakers (for example two internal speakers, or any integer number of internal speakers). Likewise, it will be understood that any number of external speakers may be provided, for example one external speaker, or a plurality of external speakers (for example two external speakers, or any integer number of external speakers). The number of internal speakers may be identical to the number of external speakers or different from the number of external speakers.

According to various embodiments, each channel of the plurality of channels may be included in one and only one of the first subset and the second subset.

According to various embodiments, the computer 214 may further include one further internal speaker (in other words: a plurality of internal speakers 202).

According to various embodiments, the interface 204 may be configured to provide information for audio output to a plurality of external speakers.

According to various embodiments, the controller 210 may be configured to provide a profile for a configuration for the internal speaker 202 and, if the determination circuit determines 208 that an external speaker is connected to the interface 204, for the external speaker.

Figure 2B:
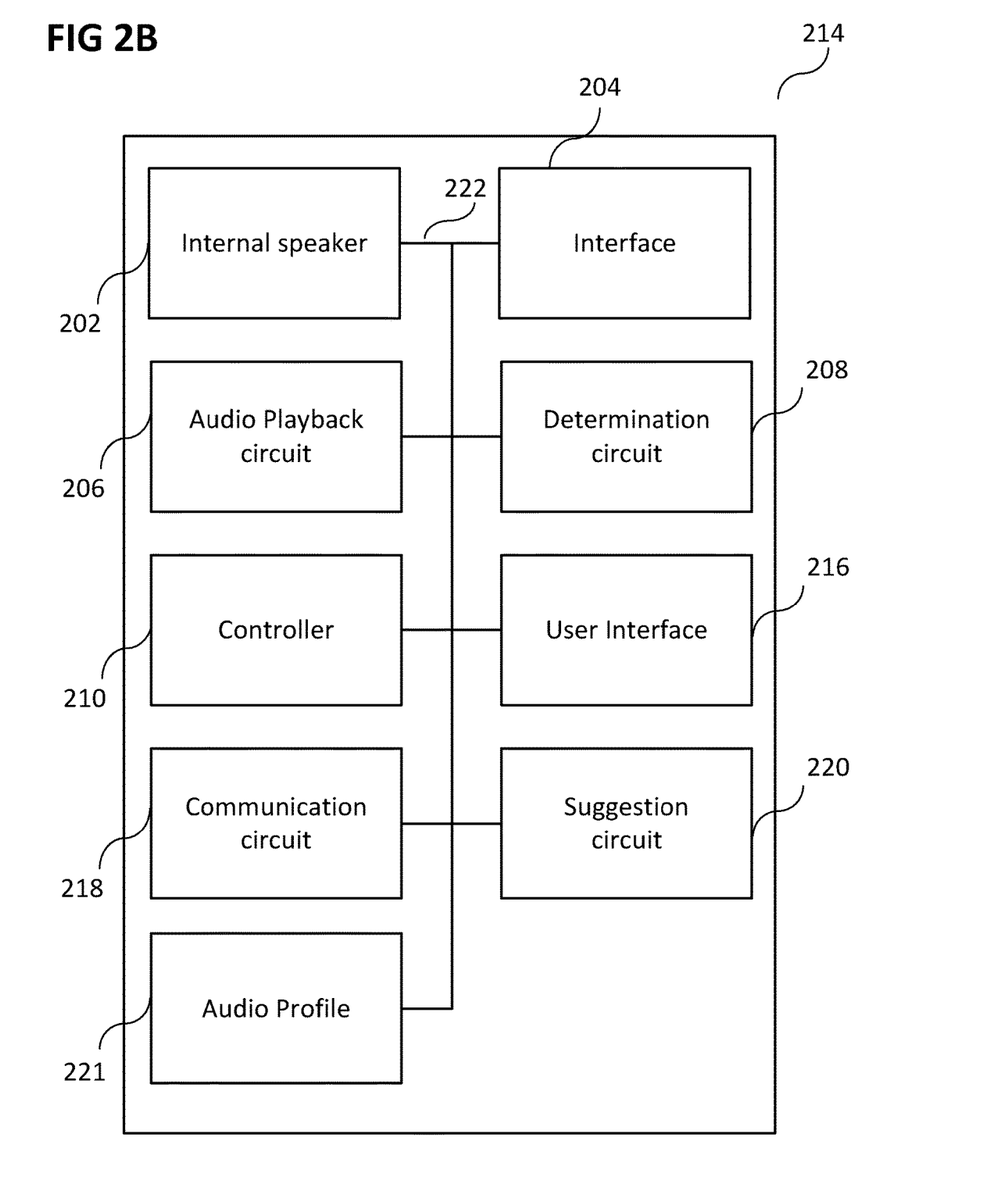

FIG. 2B shows a computer 214 according to various embodiments. The computer 214 may, similar to the computer 200 shown in FIG. 2A, include an internal speaker 202 (which is included in the computer; in other words: which is a part of the computer). The computer 214 may, similar to the computer 200 shown in FIG. 2A, further include an interface 204 (for example a wired interface, such as a stereo jack or USB, for a wireless interface, such as Bluetooth or Wireless LAN (local area network)) configured to provide information for audio output to an external speaker (which is not a part of the computer 200). The computer 214 may, similar to the computer 200 shown in FIG. 2A, further include an audio playback circuit 206 configured to provide audio information to at least one of the internal speaker 202 or the external speaker. The audio information may include information for a plurality of channels. The computer 214 may, similar to the computer 200 shown in FIG. 2A, further include a determination circuit 208 configured to determine whether an external speaker is connected to the interface 204. The computer 214 may, similar to the computer 200 shown in FIG. 2A, further include a controller 210 configured to control the internal speaker 202 to output audio information related to all channels of the plurality of channels when the determination circuit detects that an external speaker is not connected to the interface, and to control the internal speaker 202 to output audio information related to a (non-empty) first subset of channels of the plurality of channels and to control the interface so that the external speaker outputs a (non-empty) second subset of channels of the plurality of channels when the determination circuit 208 detects that an external speaker is connected to the interface 202. The computer 214 may further include a user interface 216, like will be described in more detail below. The computer 214 may further include a communication circuit 218, like will be described in more detail below. The computer 214 may further include a suggestion circuit 220, like will be described in more detail below. The internal speaker 202, the interface 204, the audio playback circuit 206, the determination circuit 208, the controller 210, the user interface 216, the communication circuit 218, and the suggestion circuit 220 may be coupled with each other, like indicated by lines 222, for example electrically coupled, for example using a line or a cable, and/or mechanically coupled.

According to various embodiments, the user interface 216 may be configured to receive information indicating the profile from a user of the computer.

According to various embodiments, the communication circuit 218 may be configured to receive the profile from a cloud computer.

According to various embodiments, the profile may be based on a custom HRTF (head related transfer function).

According to various embodiments, the computer 214 may be a portable computer, a mobile computer, a laptop, a notebook, a tablet computer, a mobile radio communication device, or a mobile phone.

According to various embodiments, the suggestion circuit 220 may be configured to provide a suggestion to a user of the computer on where to place the external speaker.

According to various embodiments, the configuration may be determined by a pre-existing profile or user configured profile as shown in 221. Pre-existing profiles may be based on a specific use case, game or application. User configured profiles may be created, edited, saved and recalled by the user or according to various events such as launching a game, application, user login etc.

Figure 2C:
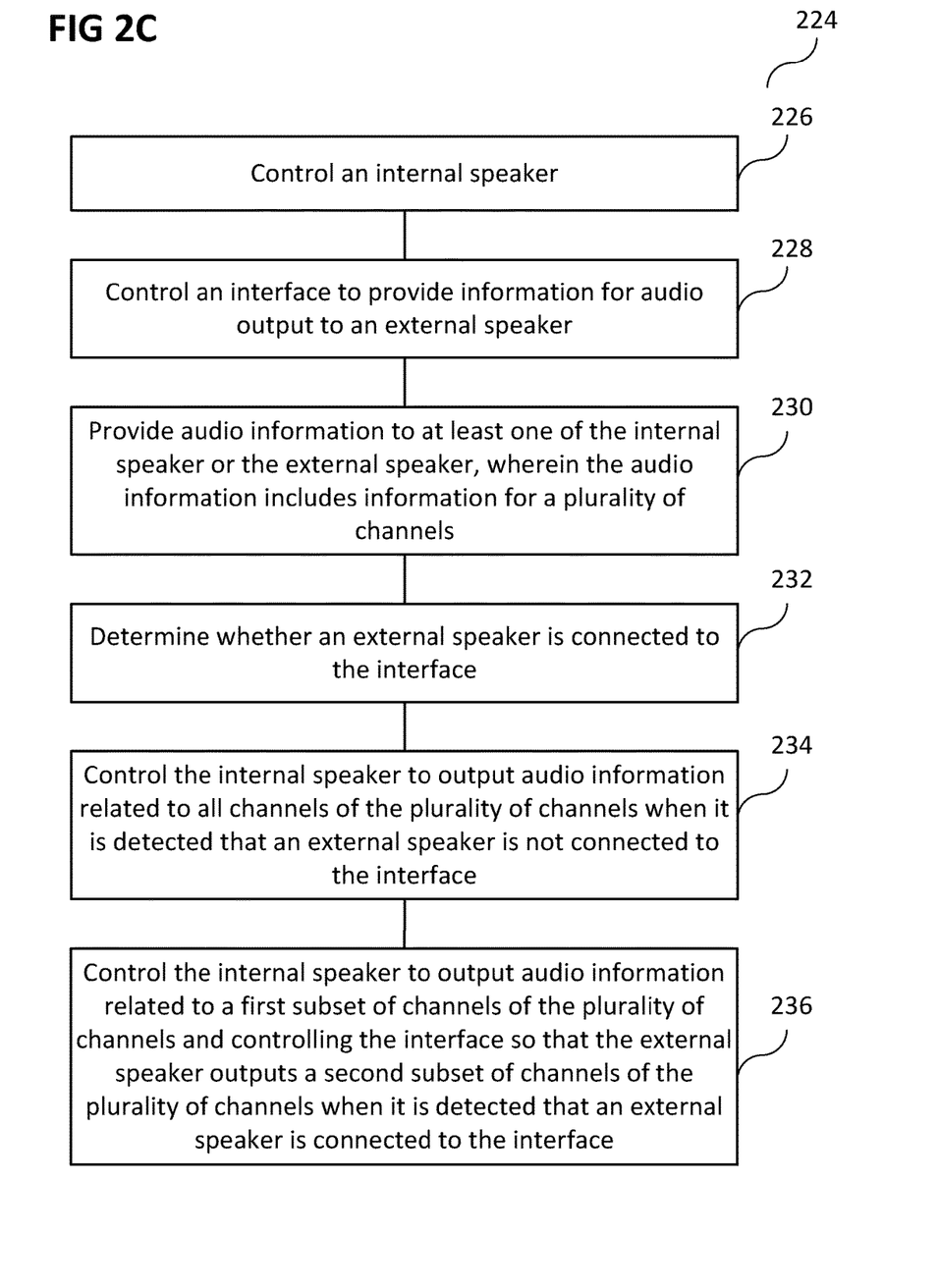
FIG. 2C shows a flow diagram illustrating a method for controlling a computer according to various embodiments.

FIG. 2C shows a flow diagram 224 illustrating a method for controlling a computer according to various embodiments. In 226, an internal speaker may be controlled. In 228, an interface may be controlled to provide information for audio output to an external speaker. In 230, audio information may be provided to at least one of the internal speaker or the external speaker, wherein the audio information comprises information for a plurality of channels. In 232, it may be determined whether an external speaker is connected to the interface. In 234, the internal speaker may be controlled to output audio information related to all channels of the plurality of channels when it is detected that an external speaker is not connected to the interface. In 236, the internal speaker may be controlled to output audio information related to a first subset of channels of the plurality of channels and controlling the interface so that the external speaker outputs a second subset of channels of the plurality of channels when it is detected that an external speaker is connected to the interface.

According to various embodiments, each channel of the plurality of channels may be included in one and only one of the first subset and the second subset.

According to various embodiments, the method may further include controlling at least one additional internal speaker.

According to various embodiments, the method may further include providing information for audio output to a plurality of external speakers.

According to various embodiments, the method may further include providing a profile for a configuration for the internal speaker and, if it is determined that an external speaker is connected to the interface, for the external speaker.

According to various embodiments, the method may further include receiving information indicating the profile from a user of the computer.

According to various embodiments, the method may further include receiving the profile from a cloud computer.

According to various embodiments, the profile may be based on a custom HRTF (head related transfer function).

According to various embodiments, the computer may be a portable computer, a mobile computer, a laptop, a notebook, a tablet computer, a mobile radio communication device, or a mobile phone.

According to various embodiments, the method may further include providing a suggestion to a user of the computer on where to place the external speakers.

According to various embodiments, a computer-readable medium may be provided which includes instructions which, when executed by a computer, make the computer perform the method for controlling a computer like described above.

Figure 3A:
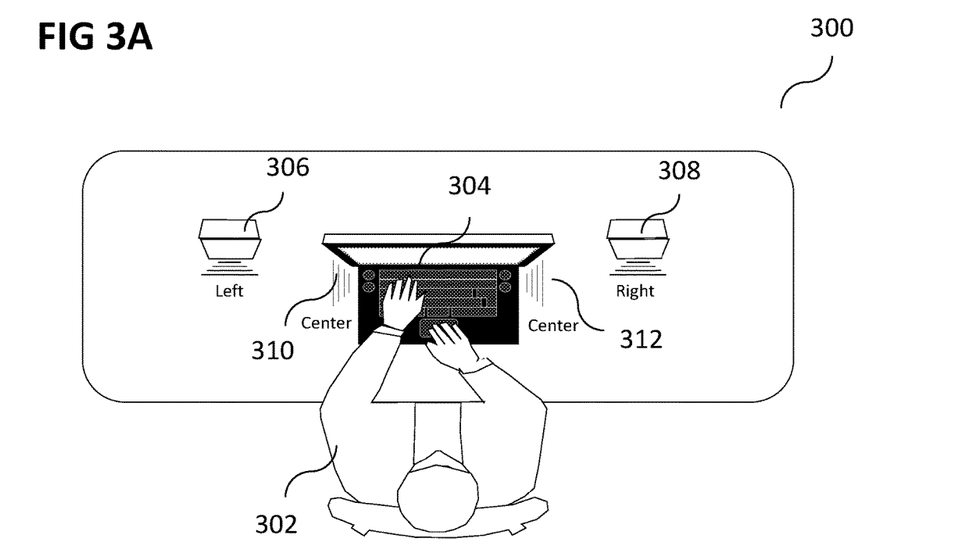
FIG. 3A, FIG. 3B, and FIG. 3C show illustrations of a computer according to various embodiments.

FIG. 3A shows an illustration 300 of a computer 304 (for example a notebook) with connected external speakers 306, 308 according to various embodiments. When a user 302 uses the computer 304 to output audio, and when the external speakers 306, 308 are connected to the computer 304, the computer speakers (i.e. the internal speakers of the computer, for example of the notebook) may play a center channel, like indicated by 310 and 312. For example, the external speaker 306 may play a left channel and the external speaker 308 may play a right channel.

Figure 3B:
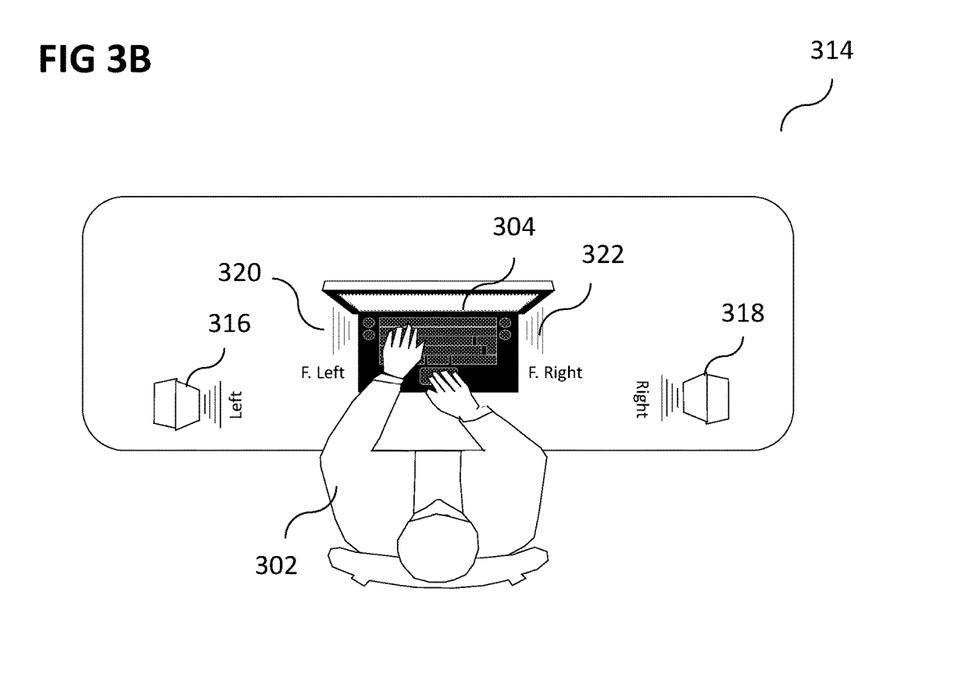

FIG. 3B shows an illustration 314 of the computer 304 (for example a notebook) with connected external speakers 316, 318 according to various embodiments. When a user 302 uses the computer 304 to output audio, and when the external speakers 316, 318 are connected to the computer 304, the computer speakers (i.e. the internal speakers of the computer, for example of the notebook) may play a left channel (like indicated by 320) and a right channel (like indicated by 322). For example, the external speaker 316 may also play the left channel and the external speaker 318 may also play the right channel.

Figure 3C:
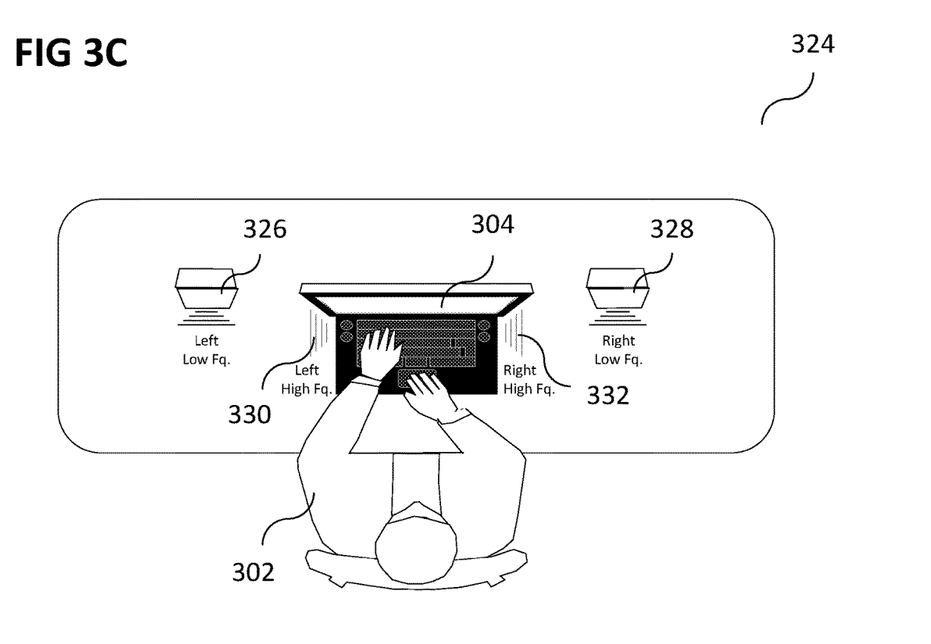

FIG. 3C shows an illustration 324 of the computer 304 (for example a notebook) with connected external speakers 326, 328 according to various embodiments. When a user 302 uses the computer 304 to output audio, and when the external speakers 326, 328 are connected to the computer 304, the computer speakers (i.e. the internal speakers of the computer, for example of the notebook) may play high frequencies of a left channel (like indicated by 330) and high frequencies of a right channel (like indicated by 332). For example, the external speaker 326 may play low frequencies of the left channel, and the external speaker 328 may play low frequencies of the right channel.

In other words, according to various embodiments, the internal speakers may play frequencies in a first frequency range (for example high frequencies), and the external speakers may play frequencies in a second frequency range (for example low frequencies). It will be understood that in this context, "high" frequencies and "low" frequencies give a relative indication of the frequency range, rather than a fixed frequency range. For example, the high frequencies may be "high" because the lowest of the high frequencies is higher than (or equal to) the highest of the low frequencies.

Various embodiments are not limited to supporting two satellite speakers (in other words: external speakers), but any number of external speakers may be provided.

According to various embodiments, devices and methods may be provided to detect the total number and type of available speakers and/or prompt the user to input the total number and type of available speakers. Based on this information devices and methods may be provided to make recommendations about placement of the speakers and settings of the speakers to achieve the best experience.

According to various embodiments, devices and methods may be provided (for example in a combination of hardware and software) to intelligently:
detect when the user has connected the notebook PC to a set of external speakers;
Automatically reconfigure the PC's audio settings. (i.e. may apply custom DSP (digital signal processor) function/s and/or unique band pass filter networks, etc.) to allow the internal speakers to be used in an advanced configuration including but not limited to:
Multi-Channel-External Speakers are used for left and right audio channels, internal notebook speakers are used for simultaneous center channel audio, enabled via a custom HRTF and/or DSP function.
Multi-Channel-External Speakers are used for left and right audio channels, internal notebook speakers are used for front left audio and front right audio channels (respectively) enabled via a custom HRTF and/or DSP function.
Crossover (which may be a default mode)—The external speakers may handle mid to high frequency playback while the internal speakers may handle low to lower mid-range frequencies enabled by way of a virtual crossover network including a custom HRTF (head related transfer function) function and various custom DSP functions.

According to various embodiments, a complete user customization of the audio properties of the speakers may be provided and custom HRTF and DSP functions may be enabled.

Figure 4:
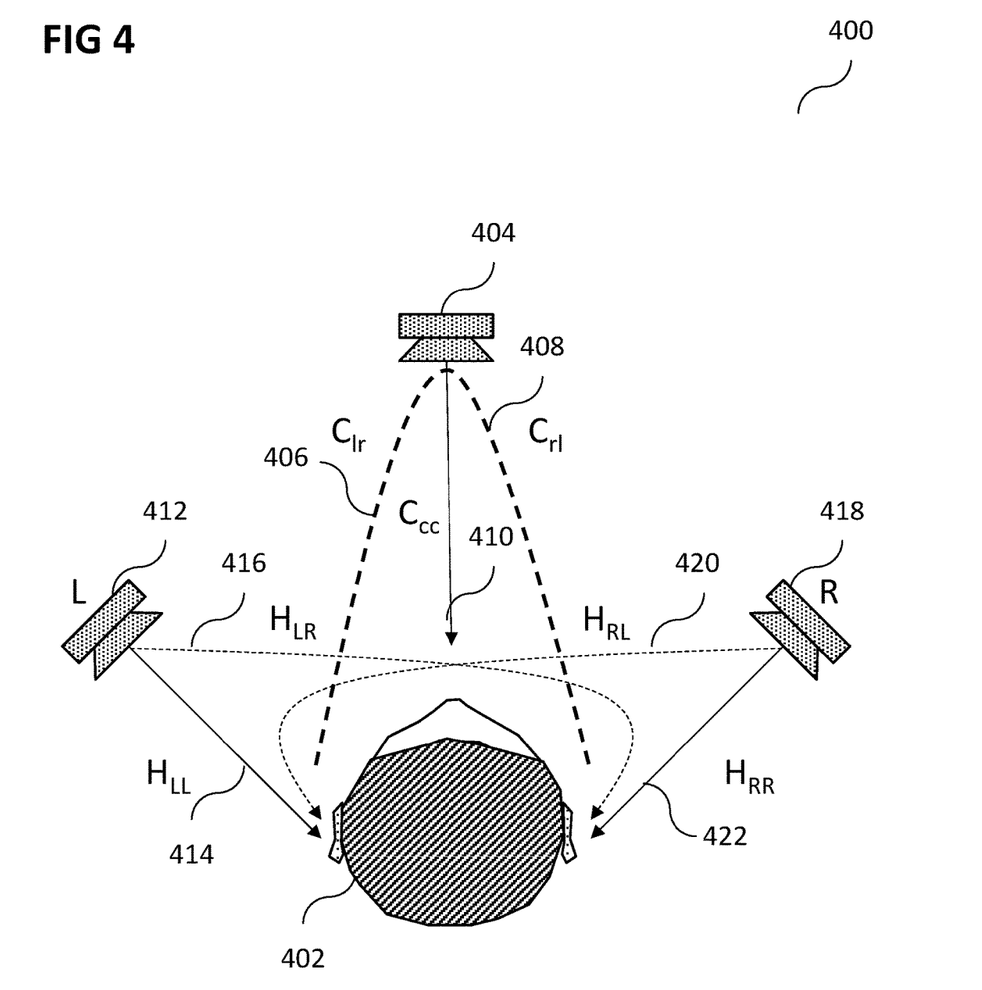
FIG. 4 shows an illustration of custom settings based on usage models or user profiles according to various embodiments.

FIG. 4 shows an illustration 400 of custom HRTF and DSP setting based on usage models or user profiles according to various embodiments. A (for example external) left speaker 412 and a (for example external) right speaker 418 are shown. Furthermore, repurposed system speakers 404 (in other words: internal speakers of a computer, for example of a notebook) configured as center channel (in other words: configured to play a center channel) are shown. The speakers are shown relative to the head of a user 402. A transfer function $c_{lr}$ 406 from the system speakers 404 to the user's left ear, a transfer function $c_{rl}$ 408 from the system speakers 404 to the user's right ear, a transfer function $c_{cc}$ 410 from the system speakers 404 to the center of the user's head, a transfer function $H_{LL}$ 414 from the left speakers 412 to the user's left ear, a transfer function $H_{LR}$ 416 from the left speakers 412 to the user's right ear, a transfer function $H_{RL}$ 420 from the right speakers 418 to the user's left ear, and a transfer function $H_{RR}$ 422 from the right speakers 418 to the user's right ear are shown.

According to various embodiments, the manner in which the internal speakers are used may be set, configured and tailored by the user. These options may be saved to profiles. Profiles may be modified by the user and saved locally or to the cloud. Profiles may be associated when designated applications are launched, applied the system detects designated events or triggered by user actions such as a pre-programmed button press, gestures or voice command.

Figure 5:
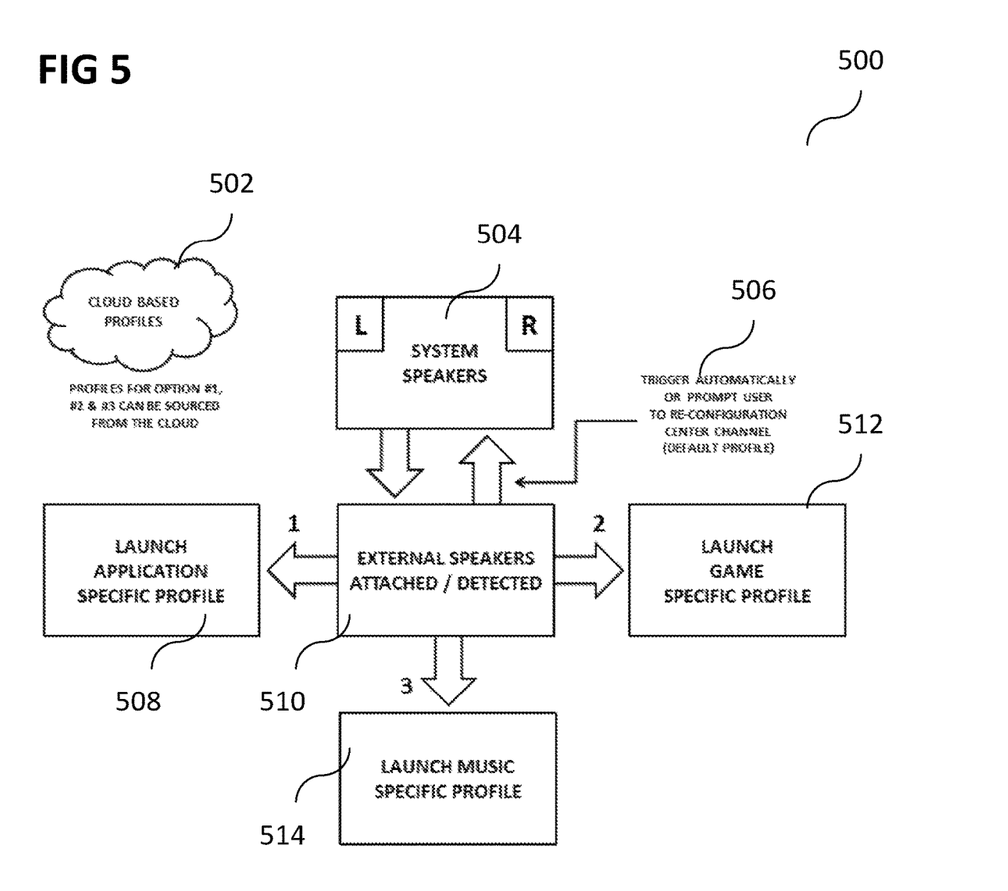
FIG. 5 shows an illustration of audio profile applications and usage models according to various embodiments.

FIG. 5 shows an illustration 500 of audio profile applications and usage models according to various embodiments. Like illustrated by block 510, it may be detected whether external speakers are attached. In 514, a music specific profile may be launched. In 512, a game specific profile may be launched. In 508, an application specific profile may be launched. Like illustrated by 506, re-configuration of a center channel (which may be a default profile) may be automatically triggered, or a user may be prompted to confirm re-configuration. The system speakers (in other words: the internal speakers), including a left speaker (L) and a right speaker (R) are illustrated by 504. Cloud based profiles 502 may be provided, for example profiles for various options (like illustrated by 508, 512, and 514) may be sourced from the cloud.

By repurposing the existing hardware according to various embodiments (as opposed to disabling it), the user may experience a richer experience, enjoy a broader range of audio fidelity and feel more immersed in their entertainment activities (for example media playback and gaming).

According to various embodiments, existing hardware (for example internal speakers of a laptop computer) may be repurposed to enable advanced multi-channel audio playback.

The following examples pertain to further embodiments.

Example 1 is a computer comprising: an internal speaker; an interface configured to provide information for audio output to an external speaker; an audio playback circuit configured to provide audio information to at least one of the internal speaker or the external speaker, wherein the audio information comprises information for a plurality of channels; a determination circuit configured to determine whether an external speaker is connected to the interface; and a controller configured to control the internal speaker to output audio information related to all channels of the plurality of channels when the determination circuit detects that an external speaker is not connected to the interface, and to control the internal speaker to output audio information related to a first subset of channels of the plurality of channels and to control the interface so that the external speaker outputs a second subset of channels of the plurality of channels when the determination circuit detects that an external speaker is connected to the interface.

In example 2, the subject-matter of example 1 can optionally include that each channel of the plurality of channels is included in one and only one of the first subset and the second subset.

In example 3, the subject-matter of any one of examples 1 to 2 can optionally include at least one further internal speaker.

In example 4, the subject-matter of any one of examples 1 to 3 can optionally include that the interface is configured to provide information for audio output to a plurality of external speakers.

In example 5, the subject-matter of any one of examples 1 to 4 can optionally include that the controller is configured to provide a profile for a configuration for the internal speaker and, if the determination circuit determines that an external speaker is connected to the interface, for the external speaker.

In example 6, the subject-matter of example 5 can optionally include a user interface configured to receive information indicating the profile from a user of the computer.

In example 7, the subject-matter of any one of examples 5 to 6 can optionally include a communication circuit configured to receive the profile from a cloud computer.

In example 8, the subject-matter of any one of examples 5 to 7 can optionally include that the profile is based on at least one of a custom HRTF (head related transfer function) or a custom DSP (digital signal processor) function.

In example 9, the subject-matter of any one of examples 1 to 8 can optionally include that the computer is at least one of a portable computer, a mobile computer, a laptop, a notebook, a tablet computer, a mobile radio communication device, or a mobile phone.

In example 10, the subject-matter of any one of examples 1 to 9 can optionally include a suggestion circuit configured to provide a suggestion to a user of the computer on where to place the external speaker.

Example 11 is a method for controlling a computer, the method comprising: controlling an internal speaker; controlling an interface to provide information for audio output to an external speaker; providing audio information to at least one of the internal speaker or the external speaker, wherein the audio information comprises information for a plurality of channels; determining whether an external speaker is connected to the interface; controlling the internal speaker to output audio information related to all channels of the plurality of channels when it is detected that an external speaker is not connected to the interface; and controlling the internal speaker to output audio information related to a first subset of channels of the plurality of channels and controlling the interface so that the external speaker outputs a second subset of channels of the plurality of channels when it is detected that an external speaker is connected to the interface.

In example 12, the subject-matter of example 11 can optionally include that each channel of the plurality of channels is included in one and only one of the first subset and the second subset.

In example 13, the subject-matter of any one of examples 11 to 12 can optionally include controlling at least one further internal speaker.

In example 14, the subject-matter of any one of examples 11 to 13 can optionally include providing information for audio output to a plurality of external speakers.

In example 15, the subject-matter of any one of examples 11 to 14 can optionally include providing a profile for a configuration for the internal speaker and, if it is determined that an external speaker is connected to the interface, for the external speaker.

In example 16, the subject-matter of example 15 can optionally include receiving information indicating the profile from a user of the computer.

In example 17, the subject-matter of any one of examples 15 to 16 can optionally include receiving the profile from a cloud computer.

In example 18, the subject-matter of any one of examples 15 to 17 can optionally include that the profile is based on at least one of a custom HRTF (head related transfer function) or a custom DSP (digital signal processor) function.

In example 19, the subject-matter of any one of examples 11 to 18 can optionally include that the computer is at least one of a portable computer, a mobile computer, a laptop, a notebook, a tablet computer, a mobile radio communication device, or a mobile phone.

In example 20, the subject-matter of any one of examples 11 to 19 can optionally include providing a suggestion to a user of the computer on where to place the external speaker.

Example 21 is a computer-readable medium comprising instructions which, when executed by a computer, make the computer perform a method for controlling a computer, the method comprising: controlling an internal speaker; controlling an interface to provide information for audio output to an external speaker; providing audio information to at least one of the internal speaker or the external speaker, wherein the audio information comprises information for a plurality of channels; determining whether an external speaker is connected to the interface; controlling the internal speaker to output audio information related to all channels of the plurality of channels when it is detected that an external speaker is not connected to the interface; and controlling the internal speaker to output audio information related to a first subset of channels of the plurality of channels and controlling the interface so that the external speaker outputs a second subset of channels of the plurality of channels when it is detected that an external speaker is connected to the interface.

In example 22, the subject-matter of example 21 can optionally include that each channel of the plurality of channels is included in one and only one of the first subset and the second subset.

In example 23, the subject-matter of any one of examples 21 to 22 can optionally include instructions which, when executed by a computer, make the computer perform: controlling at least one further internal speaker.

In example 24, the subject-matter of any one of examples 21 to 23 can optionally include instructions which, when executed by a computer, make the computer perform: providing information for audio output to a plurality of external speakers.

In example 25, the subject-matter of any one of examples 21 to 24 can optionally include instructions which, when executed by a computer, make the computer perform: providing a profile for a configuration for the internal speaker and, if it is determined that an external speaker is connected to the interface, for the external speaker.

In example 26, the subject-matter of example 25 can optionally include instructions which, when executed by a computer, make the computer perform: receiving information indicating the profile from a user of the computer.

In example 27, the subject-matter of any one of examples 25 to 26 can optionally include instructions which, when executed by a computer, make the computer perform: receiving the profile from a cloud computer.

In example 28, the subject-matter of any one of examples 25 to 27 can optionally include that the profile is based on at least one of a custom HRTF (head related transfer function) or a custom DSP (digital signal processor) function.

In example 29, the subject-matter of any one of examples 21 to 28 can optionally include that the computer is at least one of a portable computer, a mobile computer, a laptop, a notebook, a tablet computer, a mobile radio communication device, or a mobile phone.

In example 30, the subject-matter of any one of examples 21 to 29 can optionally include instructions which, when executed by a computer, make the computer perform: providing a suggestion to a user of the computer on where to place the external speaker.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A computer comprising:
   an internal speaker;
   an interface configured to provide information for audio output to an external speaker;
   an audio playback circuit configured to provide audio information to at least one of the internal speaker or the external speaker, wherein the audio information comprises information for a plurality of channels;
   a determination circuit configured to determine whether an external speaker is connected to the interface;
   a controller configured to:
      control the internal speaker to output audio information related to all channels of the plurality of channels when the determination circuit determines that an external speaker is not connected to the interface;
      control the internal speaker to output audio information related to a first subset of channels of the plurality of channels and to control the interface so that the external speaker outputs a second subset of channels of the plurality of channels when the determination circuit determines that an external speaker is connected to the interface; and
      provide a profile for a configuration for the internal speaker and, if the determination circuit determines that an external speaker is connected to the interface, for the external speaker; and
   a communication circuit configured to receive the profile from a cloud computer.

2. The computer of claim 1,
   wherein each channel of the plurality of channels is included in one and only one of the first subset and the second subset.

3. The computer of claim 1, further comprising:
   a user interface configured to receive information indicating the profile from a user of the computer.

4. The computer of claim 1,
   wherein the profile is based on at least one of a custom HRTF (head related transfer function) or a custom DSP (digital signal processor) function.

5. The computer of claim 1, further comprising:
   a suggestion circuit configured to provide a suggestion to a user of the computer on where to place the external speaker.

6. A method for controlling a computer, the method comprising:
   controlling an internal speaker;
   controlling an interface to provide information for audio output to an external speaker;
   providing audio information to at least one of the internal speaker or the external speaker, wherein the audio information comprises information for a plurality of channels;
   determining whether an external speaker is connected to the interface;
   controlling the internal speaker to output audio information related to all channels of the plurality of channels when it is determined that an external speaker is not connected to the interface;
   controlling the internal speaker to output audio information related to a first subset of channels of the plurality of channels and controlling the interface so that the external speaker outputs a second subset of channels of the plurality of channels when it is determined that an external speaker is connected to the interface;
   providing a profile for a configuration for the internal speaker and, if it is determined that an external speaker is connected to the interface, for the external speaker; and
   receiving the profile from a cloud computer.

7. The method of claim 6,
   wherein each channel of the plurality of channels is included in one and only one of the first subset and the second subset.

8. The method of claim 6, further comprising:
   receiving information indicating the profile from a user of the computer.

9. The method of claim 6,
   wherein the profile is based on at least one of a custom HRTF (head related transfer function) or a custom DSP (digital signal processor) function.

10. The method of claim 6, further comprising:
providing a suggestion to a user of the computer on where to place the external speaker.

11. A non-transitory computer-readable medium comprising instructions which, when executed by a computer, make the computer perform a method for controlling a computer, the method comprising:
controlling an internal speaker;
controlling an interface to provide information for audio output to an external speaker;
providing audio information to at least one of the internal speaker or the external speaker, wherein the audio information comprises information for a plurality of channels;
determining whether an external speaker is connected to the interface;
controlling the internal speaker to output audio information related to all channels of the plurality of channels when it is determined that an external speaker is not connected to the interface;
controlling the internal speaker to output audio information related to a first subset of channels of the plurality of channels and controlling the interface so that the external speaker outputs a second subset of channels of the plurality of channels when it is determined that an external speaker is connected to the interface;
providing a profile for a configuration for the internal speaker and, if it is determined that an external speaker is connected to the interface, for the external speaker; and
receiving the profile from a cloud computer.

12. The non-transitory computer-readable medium of claim 11,
wherein each channel of the plurality of channels is included in one and only one of the first subset and the second subset.

13. The non-transitory computer-readable medium of claim 11, further comprising instructions which, when executed by a computer, make the computer perform:
receiving information indicating the profile from a user of the computer or receiving the profile from a cloud computer.

14. The non-transitory computer-readable medium of claim 11,
wherein the profile is based on at least one of a custom HRTF (head related transfer function) or a custom DSP (digital signal processor) function.

15. The non-transitory computer-readable medium of claim 11, further comprising instructions which, when executed by a computer, make the computer perform:
providing a suggestion to a user of the computer on where to place the external speaker.

* * * * *